US011875166B2

(12) United States Patent
Ranjan

(10) Patent No.: US 11,875,166 B2
(45) Date of Patent: *Jan. 16, 2024

(54) USER INTERFACE MODALITY SWITCHING FOR TRANSACTION MANAGEMENT

(71) Applicant: Wells Fargo Bank, N.A., San Francisco, CA (US)

(72) Inventor: Rajiv Ranjan, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,471

(22) Filed: Mar. 20, 2023

(65) Prior Publication Data

US 2023/0229466 A1 Jul. 20, 2023

Related U.S. Application Data

(63) Continuation of application No. 17/445,138, filed on Aug. 16, 2021, now Pat. No. 11,609,773, which is a
(Continued)

(51) Int. Cl.
*G06F 3/048* (2013.01)
*G06F 9/451* (2018.01)
(Continued)

(52) U.S. Cl.
CPC ............ *G06F 9/453* (2018.02); *G06F 3/048* (2013.01); *G06F 3/0482* (2013.01);
(Continued)

(58) Field of Classification Search
None
See application file for complete search history.

(56) References Cited

U.S. PATENT DOCUMENTS 8,346,662 B2   1/2013  Korgav et al.
9,508,075 B2   11/2016 Geckle et al.
(Continued)

OTHER PUBLICATIONS

"U.S. Appl. No. 16/354,958, Final Office Action dated Feb. 23, 2021".
(Continued)

*Primary Examiner* — Xuyang Xia
(74) *Attorney, Agent, or Firm* — SCHWEGMAN LUNDBERG & WOESSNER, P.A.

(57) ABSTRACT

A method may include presenting a user interface (UI), to a user, in a first mode on a client device, the UI including a list portion, the list portion including a plurality of transactions associated with respective activity on a user account, and the client device including an input device; receiving an indication of a first user action on a transaction presented in the list portion of the UI; in response to receiving the indication, updating a section of the list portion corresponding to the transaction, the updating including revealing a set of options for the transaction; receiving an indication of a second user action corresponding to activation of an option of the set of options; and in response to receiving the indication of the second user action, transitioning the UI from the first mode to a second mode, the second mode including a chatbot interface instantiated with respect to the transaction.

20 Claims, 10 Drawing Sheets

Related U.S. Application Data continuation of application No. 16/354,958, filed on Mar. 15, 2019, now Pat. No. 11,093,265.

(60) Provisional application No. 62/643,381, filed on Mar. 15, 2018.

(51) Int. Cl.

| | | |
|---|---|---|
| *G06F 16/245* | (2019.01) | |
| *G06F 16/248* | (2019.01) | |
| *G06F 16/23* | (2019.01) | |
| *G06Q 30/016* | (2023.01) | |
| *G06F 3/04883* | (2022.01) | |
| *G06F 3/0485* | (2022.01) | |
| *H04L 51/02* | (2022.01) | |
| *G06Q 20/40* | (2012.01) | |
| *G06F 3/0482* | (2013.01) | |

(52) U.S. Cl.
CPC ........ *G06F 3/0485* (2013.01); *G06F 3/04883* (2013.01); *G06F 16/2379* (2019.01); *G06F 16/245* (2019.01); *G06F 16/248* (2019.01); *G06Q 20/407* (2013.01); *G06Q 30/016* (2013.01); *H04L 51/02* (2013.01)

(56) References Cited

U.S. PATENT DOCUMENTS

| | | | |
|---|---|---|---|
| 11,093,265 | B1 | 8/2021 | Ranjan |
| 2009/0099884 | A1 | 4/2009 | Hoefelmeyer et al. |
| 2010/0087230 | A1 | 4/2010 | Peh et al. |
| 2011/0055074 | A1 | 3/2011 | Chen et al. |
| 2012/0016678 | A1 | 1/2012 | Gruber et al. |
| 2012/0101930 | A1* | 4/2012 | Li .................... G06Q 40/02 705/35 |
| 2012/0260263 | A1 | 10/2012 | Edoja |
| 2014/0279500 | A1 | 9/2014 | Larko et al. |
| 2015/0220914 | A1 | 8/2015 | Purves et al. |
| 2015/0242837 | A1 | 8/2015 | Yarbrough et al. |
| 2015/0248217 | A1* | 9/2015 | Cai .................... G06F 3/04883 715/765 |
| 2015/0346916 | A1 | 12/2015 | Jisrawi et al. |
| 2016/0291846 | A1 | 10/2016 | Deweese et al. |
| 2017/0061440 | A1* | 3/2017 | Belchee ............ G06Q 20/4016 |
| 2017/0103346 | A1 | 4/2017 | Bodell et al. |
| 2017/0169101 | A1 | 6/2017 | Walia et al. |
| 2017/0200234 | A1 | 7/2017 | Morse et al. |
| 2017/0357435 | A1 | 12/2017 | Taslimi |
| 2018/0101874 | A1* | 4/2018 | Laski ................. G06Q 30/0271 |
| 2019/0036864 | A1* | 1/2019 | Reuss ................. H04W 12/108 |

OTHER PUBLICATIONS

"U.S. Appl. No. 16/354,958, Non Final Office Action dated Sep. 15, 2020".

"U.S. Appl. No. 16/354,958, Notice of Allowance dated Apr. 16, 2021", 7 pgs.

"U.S. Appl. No. 16/354,958, Response filed Apr. 5, 2021 to Final Office Action dated Feb. 23, 2021", 8 pgs.

"U.S. Appl. No. 16/354,958, Response filed Dec. 15, 2020 to Non Final Office Action dated Sep. 15, 2020", 11 pgs.

"U.S. Appl. No. 17/445,138, Examiner Interview Summary dated Oct. 31, 2022".

"U.S. Appl. No. 17/445,138, Non Final Office Action dated Jul. 28, 2022".

"U.S. Appl. No. 17/445,138, Notice of Allowance dated Nov. 17, 2022", 12 pgs.

"U.S. Appl. No. 17/445,138, Response filed Oct. 28, 2022 to Non Final Office Action dated Jul. 28, 2022", 13 pgs.

Mrkalj, Marijana, "AI-Powered Chatbots to Deliver Better Banking Experiences", [Online]. [Accessed Mar. 8, 2018]. Retrieved from the Internet: <URL: https://chatbotsmagazine.com/ai-powered-chatbots-to-deliver-better-banking-experiences-802f3c8ee75f>, (Mar. 3, 2017), 6 pgs.

* cited by examiner

USER INTERFACE MODALITY SWITCHING FOR TRANSACTION MANAGEMENT

RELATED APPLICATIONS

This patent application is a continuation of U.S. patent application Ser. No. 17/445,138, filed Aug. 16, 2021, now issued as U.S. Pat. No. 11,609,773, which is a continuation of U.S. patent application Ser. No. 16/354,958, filed Mar. 15, 2019, now issued as U.S. Pat. No. 11,093,265, which claims the benefit of priority, under 35 U.S.C. § 119(e), to U.S. Provisional Patent Application Ser. No. 62/643,381, titled "USER INTERFACE MODALITY SWITCHING FOR TRANSACTION MANAGEMENT," filed on Mar. 15, 2018, which is incorporated by reference in its entirety.

BACKGROUND

As mobile devices become increasingly powerful, they often are the main or only computing devices for users. Using mobile devices creates a number of technical challenges due to the limited screen size and input methods compared to a desktop computer.

In some instances, a user may interact with a chatbot on a mobile device. The chatbot may help the user place an order, reserve a spot at a restaurant, or retrieve the current weather forecast. Often the chatbot interface is self-contained and does not have knowledge of data outside of what has been inputted by the user.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an Application Programming Interface (API) or other program communication method. Similarly, the variables may be assumed to have a default values should a specific value not be described. Various systems may provide a user interface for an end-user or administrator to edit the variable values in some instances Customer service still often requires a customer to call a phone number of a company and speak to an actual representative. Although interactive voice response (IVR) systems are prevalent, they suffer from a number of problems. For example, IVR systems are inherently auditory in nature. Thus, confirmations to a customer require repeating back information. Additionally, IVR systems require provisioning of physical resources such as telephone lines in order to handle customer calls.

Customer chat is another channel of customer service that is increasingly common. Yet, the deployment of a chat interface is generally put on a website of a business with no context as to what the customer is doing. Accordingly, even if a customer is looking at his or her bill and has a question, the customer may still need to enter in the customer's account number, etc., into the chat interface.

Systems and methods described herein are directed towards a new user interface model to help alleviate the limitations of current user interaction models on mobile devices, IVR systems, and chat interfaces. For example, a system may include a user interface on a mobile device that includes a first modality that includes a list of transactions and a second modality with a chatbot interface that is instantiated based on selection of a transaction of the list of transactions. In doing so, the limited display size of a mobile device may be efficiently used for a user to interact with a business and physical resources of the business may not be needed (e.g., telephone lines and computing systems for CSRs).

Figure 1:
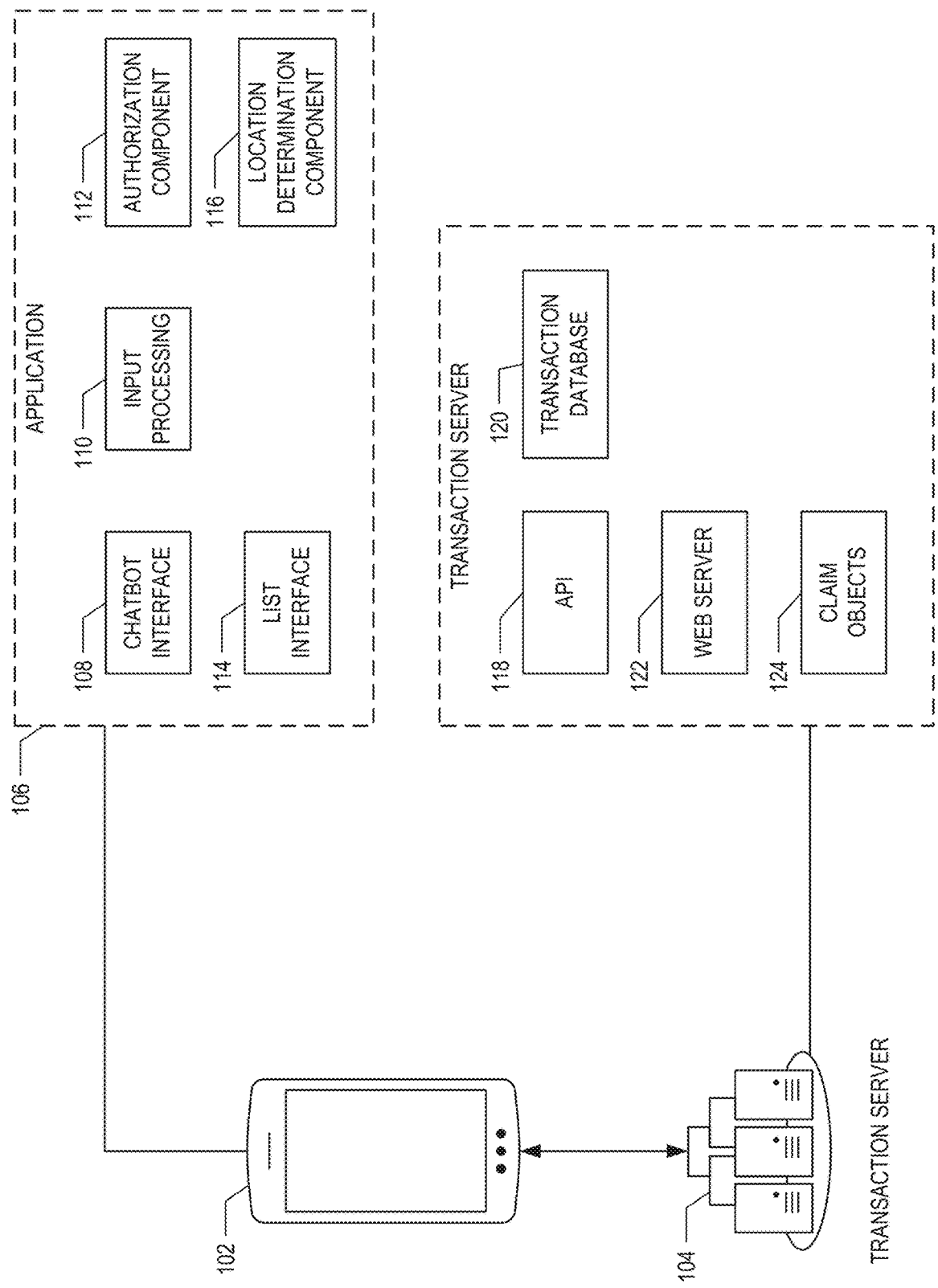
FIG. 1 is a schematic drawing illustrating an application and a transaction server, according to various examples.

FIG. 1 is a schematic drawing illustrating an application and a transaction server. FIG. 1 includes client device 102, transaction server 104, and application 106. Application 106 includes chatbot interface 108, input processing 110, authorization component 112, list interface 114, and location determination component 116. Transaction server 104 includes application programming interface (API) 118, transaction database 120, web server 122, and claim objects 124.

For illustration purposes, application 106 and transaction server 104 are illustrated as set of separate components. However, the functionality of individual components may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Similarly, the location of the components may be different in different examples. For example, application 106 may be a wrapper around a web-client that is accessing a webpage hosted by web server 122. Accordingly, some or all of input processing related to user interactions with data may occur at transaction server 104. Similarly, the logic/rules for presentation of chatbot interface 108 and list interface 114 may also reside in transaction server 104 in some examples.

In various examples, the assets and components in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

Client device 102 may be, but is not limited to, a smartphone, tablet, laptop, multi-processor system, microprocessor-based or programmable consumer electronics, game console, set-top box, or any other device that a user utilizes to communicate over a network. In example embodiments, client device 102 comprises a display module (not shown) to display information (e.g., in the form of specially configured user interfaces). In some embodiments, client device 102 may comprise one or more of a touch screen, camera, keyboard, microphone, and Global Positioning System (GPS) device.

In some examples, client device 102 may lack physical input mechanisms beyond a touchscreen. Accordingly, the primary interfaces for user may be gesture-based touch controls or audio input. As discussed further herein, input processing 110 may execute program code based on inputs received by application 106.

Application 106 may be downloaded through an app store provided by a manufacturer of client device 102 and installed on client device 102. In other examples, application 106 may be downloaded directly from the creator of application 106 via a website. Application 106 may provide data concerning user activity associated with a user account. For example, application 106 may be associated with a financial institution and the user activity may be debits or credits related to transaction accounts for the user.

Authorization component 112 may be used to authorize the user with respect to application 106 as well as transaction server 104. For example, application 106 may present a user interface in which the user may enter in a username and password. Other authentication techniques may be used without departing from the scope of this disclosure including, but not limited to, facial identification and fingerprint scanning. While communicating with transaction server 104, an indication of the authorization status of user may be transmitted as well. Thus, if transaction data is being requested from transaction server 104, a separate authentication request may not be needed.

The user interface (UI) of application 106 may operate in a number of modes (modalities) for interacting with the past user activity. For example, list interface 114 may be used to present a list of transaction accounts of a user and activity of the accounts (e.g., transactions) in chronological or other orders (e.g., amount, type, etc.). When using list interface 114, the user may interact using touch or other physical input mechanisms (e.g., mouse, styluses), etc. List interface 114 may be useful for a user to see an overview of all the user's transactions. In doing so, the user may notice that one of transactions was unauthorized. Unauthorized may mean a transaction was made by someone other than the user. For example, the card number for a checking account of the user may have been taken and used fraudulently to purchase an item.

Traditionally, when a user notices unauthorized activity, the user is forced to make a telephone call to the provider of the account (e.g., the user's bank). The user may have to authenticate themselves to a customer service representative (CSR) despite the user having already authenticated themselves within an application (e.g., using authorization component 112) or a website.

Additionally, the user may have to repeat information related to the unauthorized transaction to the CSR. Furthermore, the CSR may have to manually repeat a number of transactions that may or may not have been unauthorized to get confirmation of their authenticity from the user. Finally, in many cases, after a claim has been created that identifies unauthorized transactions, users are unable to check on the status of the claim. Some systems may proactively notify a user of potentially fraudulent activity on the user's account. Yet, even then, the user is often forced to make a telephone call and have a similar back-and-forth conversation as described above.

List interface 114 may be configured to alleviate the need for a telephone conversation with CSR. For example, a user may select one or more transactions believe to be unauthorized. Input processing 110 may process the selection to obtain transaction details on the transaction(s) identified by the selection. For example, a transaction identifier, amount, and date of the transaction may be determined.

Upon receiving the transaction details, the user interface of application 106 may transition to chatbot interface 108. Transitioning may include passing (e.g., using an API) transaction details on the identified transactions to chatbot interface 108. Using these details, a series of questions may be presented to the user via an automated chatbot. The user may answer using voice or other input mechanisms such as a keyboard or touch interface, which may be processed by input processing 110 of a client device 102. Processing may include performing voice-to-text analysis and natural language processing as are known to those skilled in the art. A more detailed walk-through example of using list interface 114 chatbot interface 108 is discussed beginning with FIG. 2.

Chatbot interface 108 may operate according to an underlying chatbot model (e.g., an automated electronic digital assistant). The model may act according to a set of predefined business rules and/or trained machine leaning (ML) model. Business rules may a define a series of if/then operations; whereas an ML model may offer more flexibility. For example, if a user's response does not conform to one of the predefined business rules, the chatbot may have to resort to asking the user to try another response. In contrast, an ML model, such as a neural network or k-means clustering, may make a guess based on probabilities of what the user's intent was, regardless of whether the user's response has been seen before. In either case, the chatbot may be trained or otherwise improved over time based on interactions with user(s) as one skilled in the art would recognize.

Location determination component 116 may be used to determine the location of client device 102. In an example, location determination component 116 issues a query to operating system of client device 102 for the location. The operating system may access sensor data (e.g., from a GPS sensor) to determine the location. The location may be a set of geo-coordinates or geographic location (e.g., address). Application 106 may use this information to direct the user to physical establishments that may be able to issue a replacement card or temporary card for a user's account. The location may also be used by a financial institution as a factor in denying a transaction or as an authentication factor.

Transaction database 120 may store data on transactions for a number of users. A transaction may be stored according to a standardized data structure. For example, the transaction data structure may include fields for transaction account identification (e.g., checking account number), transaction type (e.g., debit/credit), authorization status (e.g., approved, pending, unauthorized), date, and amount. More or fewer fields may be used without departing from the scope of this disclosure. The account identification may correspond to a user account. A user account may be associated with multiple transaction accounts.

Claim objects 124 may be data structures that identify one or more transactions as unauthorized. A claim object may be generated during a user's interaction with chatbot interface 108. The claim object may also include a status (e.g., open, complete, etc.), a claim identifier, a user identifier, a data created, transaction identifier(s), etc. Claim objects 124 may be stored in transaction database 120 in some examples.

Data used by application 106 and transaction server 104 may be organized and stored in a variety of manners. For convenience, the organized collection of data is described herein as transaction database 120. The specific storage layout and model used in transaction database 120 may take a number of forms—indeed, transaction database 120 may utilize multiple models. The database 116 may be, but is not limited to, a relational database (e.g., SQL), non-relational database (NoSQL) a flat file database, object model, document details model, graph database, shared ledger (e.g., blockchain), or a file system hierarchy. Transaction database 120 may store data on one or more storage devices (e.g., a hard disk, random access memory (RAM), etc.). The storage devices may be in standalone arrays, part of one or more servers, and may be located in one or more geographic areas.

API 118 and web server 122 may be used together to present data on client device 102 and send/receive data with application 106. An API provides a method for computing processes and systems to exchange data. A web-based API, such as API 118, may permit communications between two or more computing devices. The API may define a set of HTTP calls according to Representational State Transfer (RESTful) practices.

A RESTful API may define various GET, PUT, POST, DELETE methods to create, replace, update, and delete data stored on a transaction database 120. For example, application 106 may use a "GET/transactions/userid" call to retrieve transaction for the identification indicated by "userid" and display them in list interface 114. Another API call may be used to create a claim object that identifiers a series of transaction identifiers. API 118 may transmit responses to requests for data according to the JavaScript Object Notation (JSON) format. Similarly, data transmitted via API 118—from application 106, for example—may be encoded in the JSON format and submitted in the content portion of a PUT request.

Web server 122 may be used to exchange information with users via a network such as the Internet. Although generally discussed in the context of delivering webpages via the Hypertext Transfer Protocol (HTTP), other network protocols may be utilized by web servers 110 (e.g., File Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of a webpage hosted by web server 122. In response, web server 122 may transmit a web page/application that is rendered on a display device of client device 102. In some examples, the web application is application 106.

Figure 2:
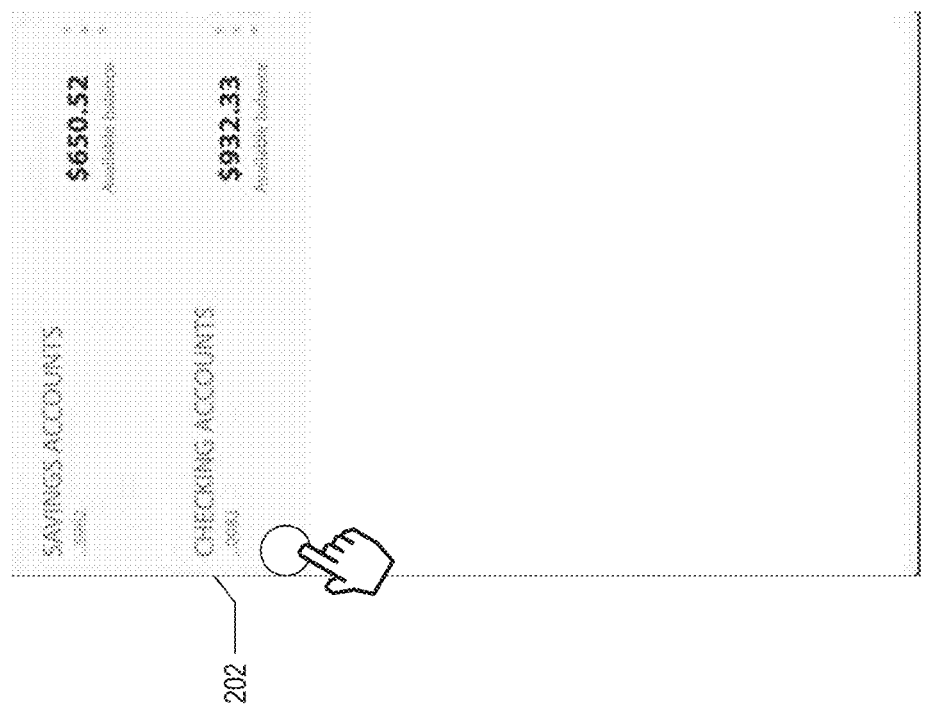
FIG. 2 is an account selection interface, according to various examples.

FIG. 2 is an account selection interface, according to various examples. The account selection interface may be part of, or be presented, by application 106. FIG. 2 may be presented after a user authenticates themselves with application 106. For example, application 106 may use the credentials entered by the user and transmit them to transaction server 104. In response, server 104 may return identifiers of transaction accounts associated with the user credentials. As illustrated, the transaction accounts may include a savings account and a checking account 202. The user may make a selection on the account selection interface—such as checking account 202—to see activity associated with the selected account.

Figure 3:
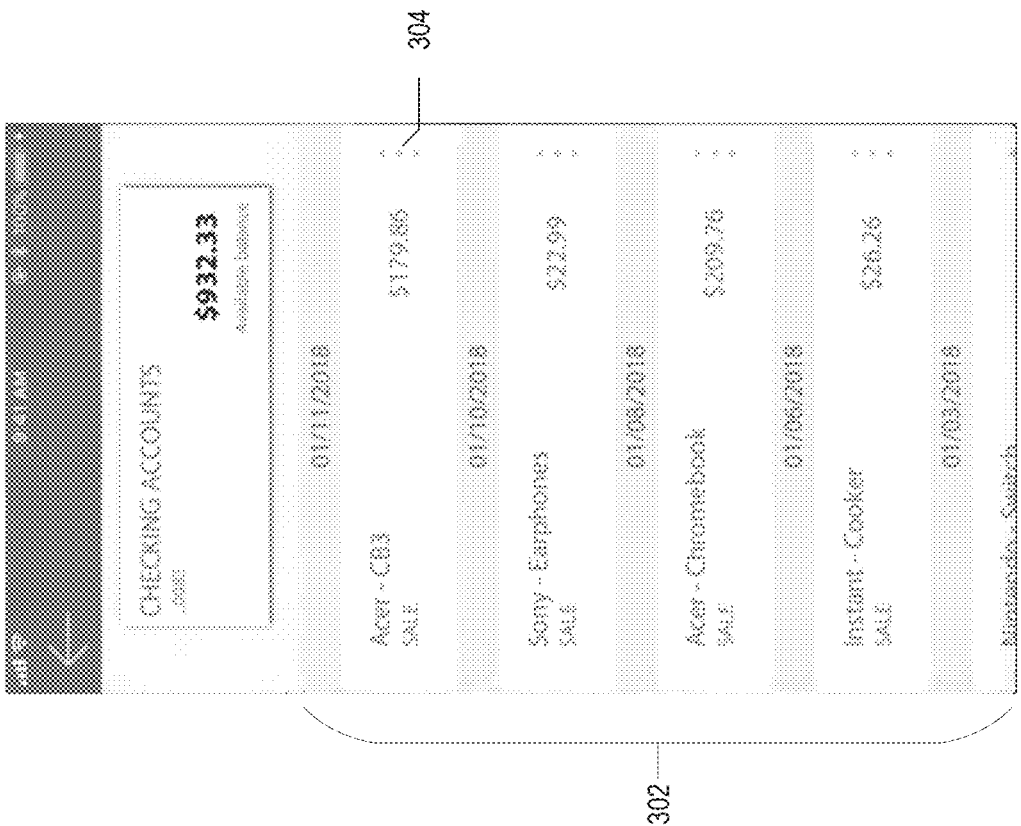
FIG. 3 is a transaction list interface, according to various examples.

FIG. 3 is a transaction list interface, according to various examples. The transaction list interface may include a list portion 302 and user action control 304 and be part of a UI of application 106. The transaction list interface may be presented in response to a selection from an account selection interface. List portion 302 may include a plurality of transactions associated with respective user activity on a user account—in this case, a checking account. The plurality of transactions may be received from transaction server 104.

Application 106 may receive indications of user actions with respect to particular transactions resented in list portion 302. The indication may come from, for example, the operating system (OS) of a client device. Consequently, if a user clicks with a mouse or touches a UI element with the user's finger, the OS may transmit a signal to application 106 with the location, and if applicable, a gesture identification (e.g., swipe left) of the interaction. In response, application 106 may perform in various functions as described further below.

Figure 4:
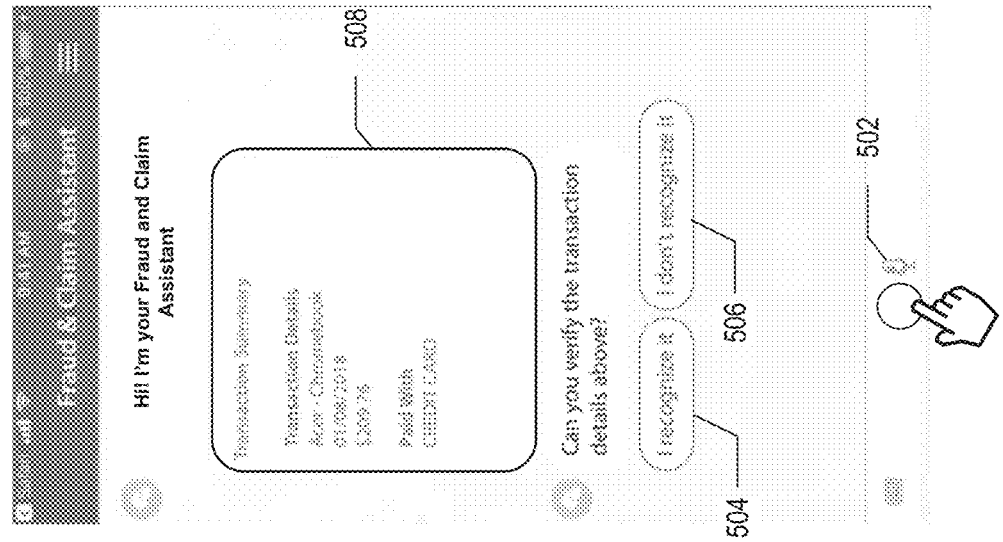
FIG. 4 illustrates an interaction with a transaction, according to various examples.
Figure 15:
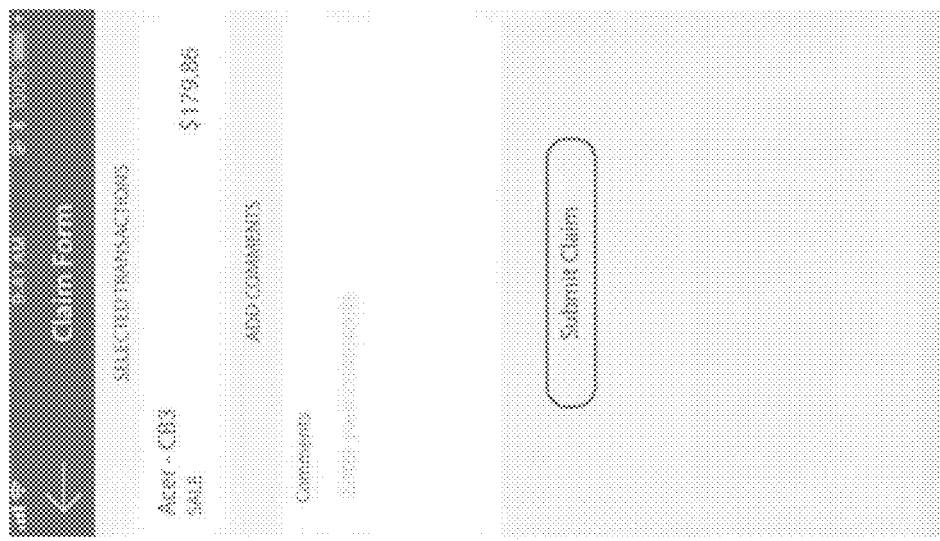
FIG. 15 is a claim form interface, according to various examples.

FIG. 4 illustrates an interaction with a transaction, according to various examples. Individual transactions may be interacted with by a user using input device on the client device. For example, a user may swipe left on a transaction. In response, a section of the list portion corresponding to a transaction may be updated to reveal a set of options 402 for the transaction. To make room for the options, a portion of the transaction may be slid out of view in an animated fashion. Other presentation modes and techniques presenting the set of options 402 may be used without departing from the scope of this disclosure. The set of options 402 may include an option to file a claim using a claim form interface—such as presented in FIG. 15—and an option to use a chatbot interface.

FIGS. 5-12 and 14 are chatbot interfaces, according to various examples. These figures are discussed in the context of the user interacting with a chatbot in a single chatbot session in chronological order; however, a user may interact with the chatbot without going through each of the illustrated interactions.

The chatbot session may begin in response to receiving an indication of a user action corresponding to activation of an option (e.g., clicks a message icon) of the set of options illustrated in FIG. 4. For example, application 106 may transition its user interface from a first mode, which displays the list portion, to a second mode that includes a chatbot interface. The chatbot interface may be instantiated with respect to a particular selected transaction. Accordingly, the transaction details of one or more user selected (e.g., clicks, swipes) transaction from the list may be saved for use in queries by the chatbot interface. A transaction summary 508 may present the transaction details including an item name, purchase date, an amount, and how the transaction was paid for.

The chatbot interface may be presented without the user selecting one of the options. For example, a financial institution may determine that a transaction was potentially fraudulent and transmit a push notification to the client device 102 (e.g., via transaction server 104). The user may click the push notification and the chat interface may be instantiated with respect to the potentially fraudulent transaction.

Figure 5:
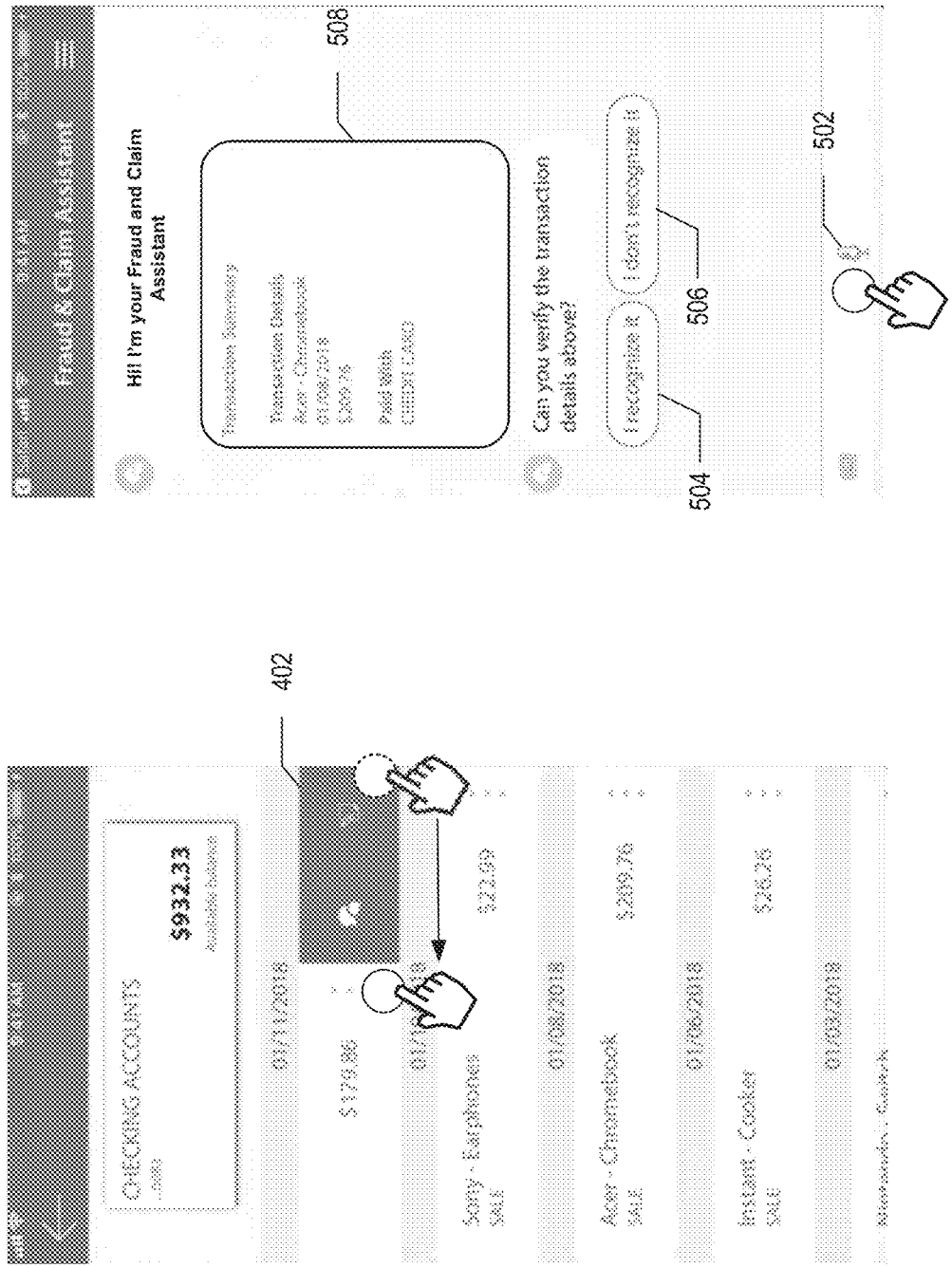
FIGS. 5-12 are chatbot interfaces, according to various examples.

With respect to FIG. 5, it may be seen that a query with respect to a status of a transaction is presented. The chatbot interface presents options 504 and 506 with respect to the status. Voice response option 502 may be used if a user would like to respond by voice instead of text input or clicking/touching the options. If a user activates voice response option 502, audio data may be received that has been captured by the client device and processed to determine a response to the query. Processing may include converting the audio to text using techniques known in the art. The text may be compared to the presented options to determine response by the user.

The audio response need not correspond directly to one of the presented options. For example, instead of "I don't" the user may have responded "I do not recognize that transaction." In such an instance, input processing 110 may determine the likelihood that the user selected each of the two presented options and select the more likely of the two. Any suitable text similarity algorithm may be used, as are known in the art, without departing from the scope of this disclosure.

In the presented scenario, selection of option 504 may indicate the transaction was authorized. In contrast, a selection of option 506 may indicate that the user activity with respect to the displayed transaction was not authorized by the user (e.g., was fraudulent).

Figure 6:
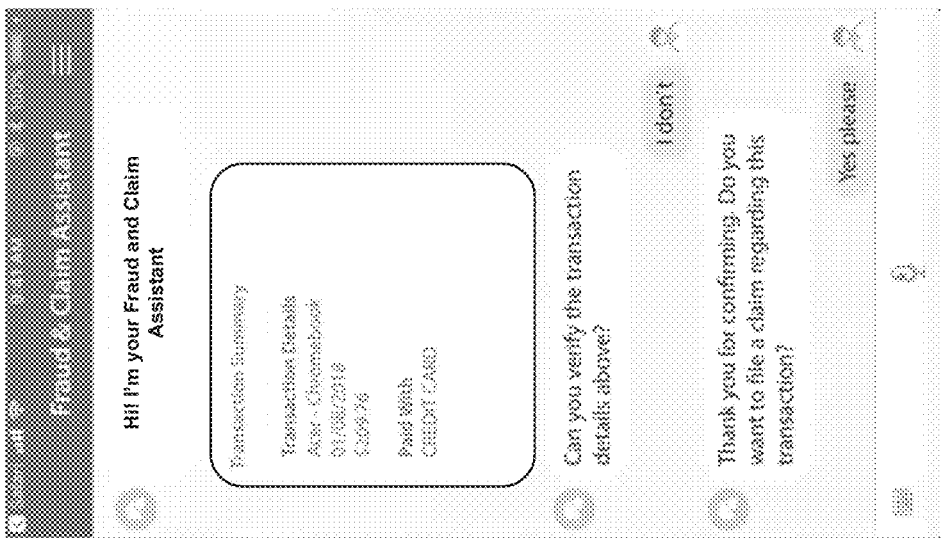
Figure 9:
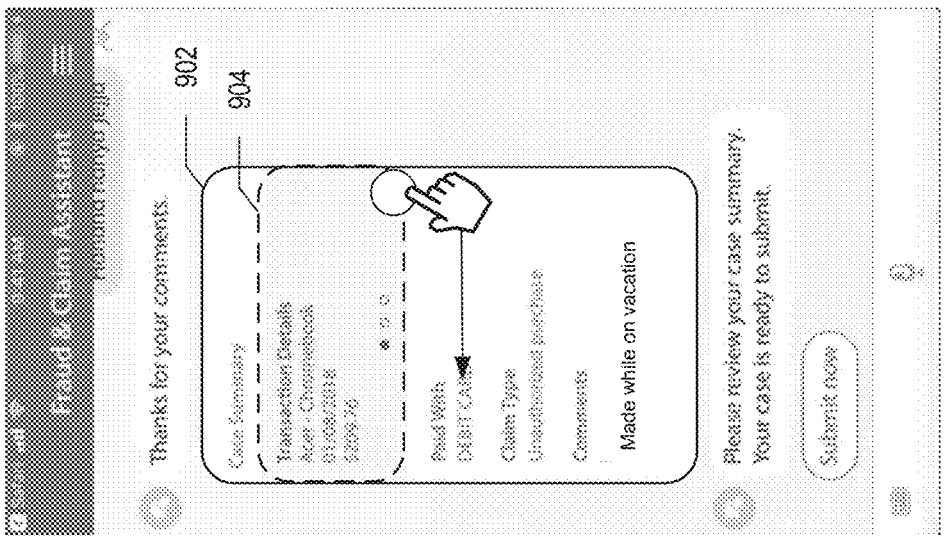
Figure 8:
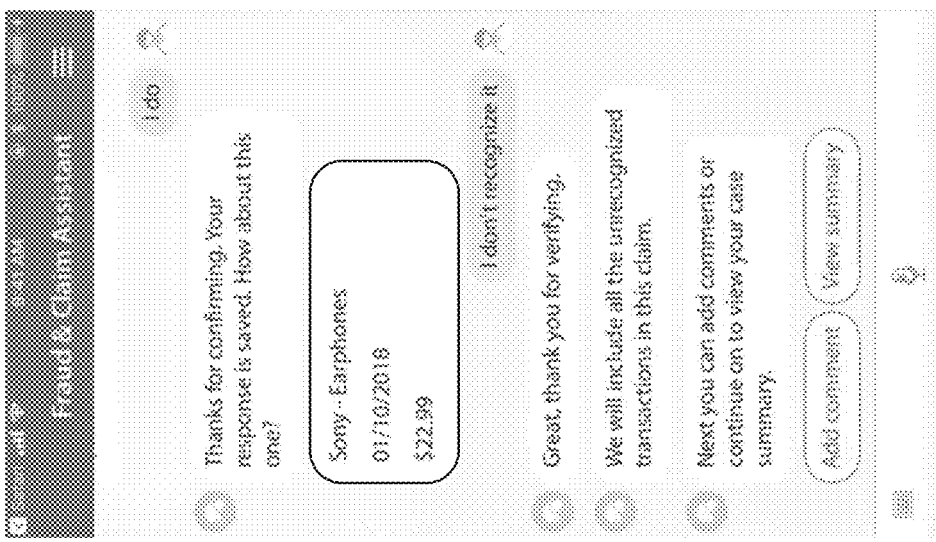

Continuing to FIG. 6, the chatbot interface has been updated to remove the options with respect to the query on the status of the transaction. In place of the options, a response received by and the user is presented. Additionally, the chatbot interface indicates that the user has responded affirmatively to generate a claim based on a transaction.

Figure 7:
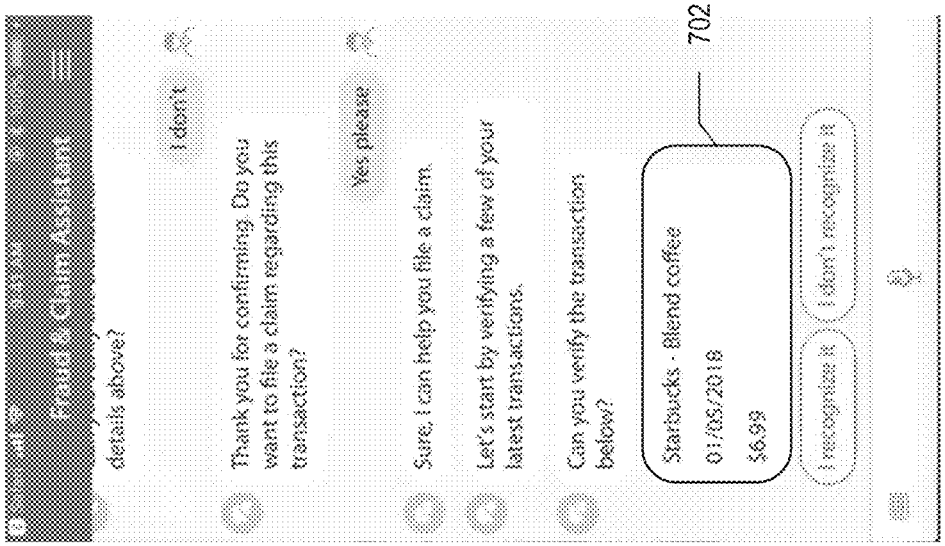

FIG. 7 continues a line of questioning to the user with respect to other transactions that may not have been authorized by the user. For example, transaction 702 may have been a transaction that was made within a threshold amount of time of the transaction initially selected in the list portion of the interface. The chatbot interface may present each transaction that is within the threshold and ask the user whether or not the respective transaction was authorized/recognized. After the transactions have been presented to the user, the user is given an option to add comments to the claim in FIG. 8.

After adding any comments, a claim object may be generated that identifies the transaction(s) as unauthorized. With respect to FIG. 9, a representation of the claim object 902 may be presented in the chatbot interface. The representation of the claim object 902 may be a summary of details of the claim object. Within a transaction details section 904, a set of transactions identified by the user as unauthorized may be presented. As illustrated, the three dots at the bottom of details section 904 may indicate that there are three transactions associated with the claim object. The first dot is filled in indicating that the transaction details presented are for the first transaction in the set of transactions. Other visual/textual representations of the amount of transactions may be used as well.

Figure 10:
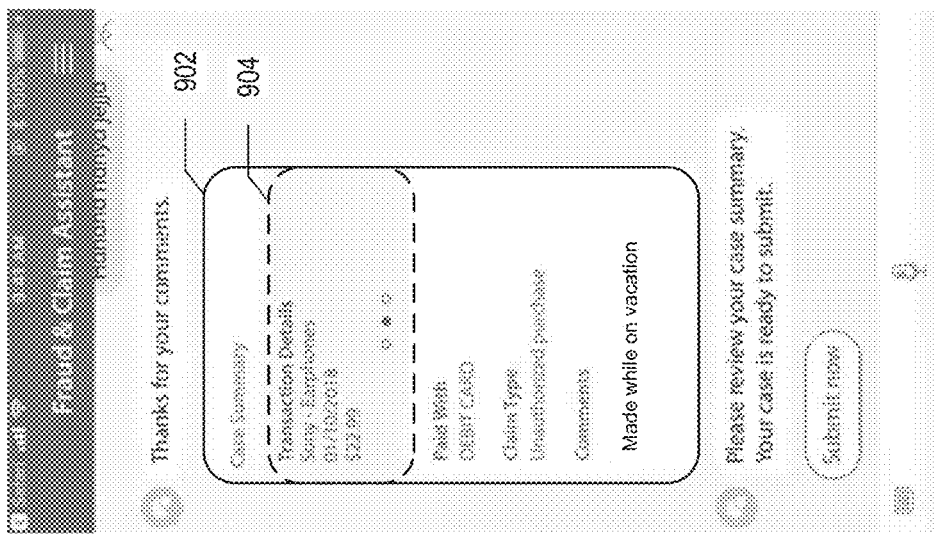

FIG. 10 illustrates transaction details section 904 with the middle dot filled in—indicating the second transaction of the set of transaction is being displayed. The second transaction may be displayed in response to receiving an indication of swipe user action on the claim object 902 (e.g., within transaction detail section 904). Accordingly, the representation of the claim object may be updated. Some examples of dating may include and animation of one transaction sliding off the screen while presenting another transaction.

Figure 11:
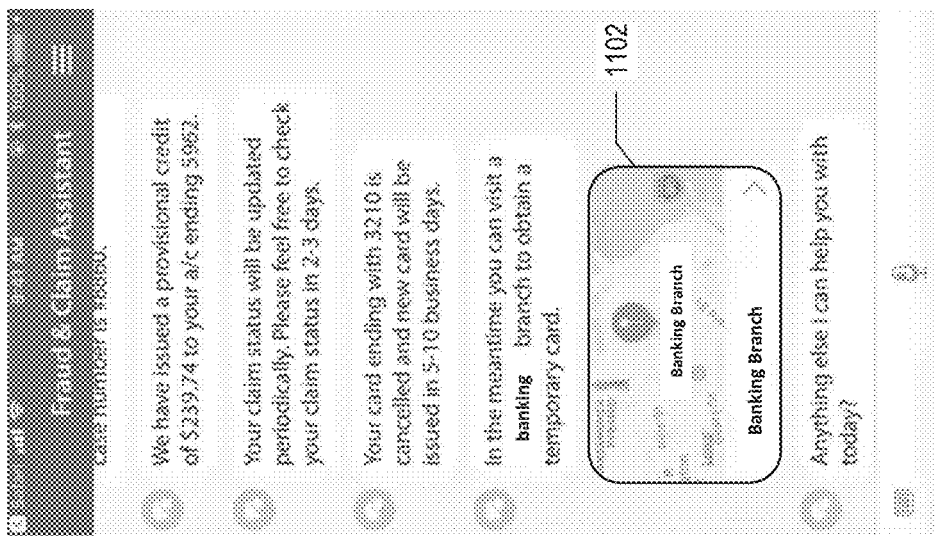

Upon a user confirming—such as selecting/saying "Submit now" in FIG. 10—a summary of actions taken by application 106 or transaction server 104 may be presented to the user in FIG. 11. Additionally, user interface (UI) map object may be presented in the chatbot interface identifying a store closest to the location of the client device operating application 106. To determine the store closest to the location, a location of the client device may be obtained and used as a query of a database of stores using location. The database may be stored on client device 102 or transaction server 104. The store may be a place in which a user may pick up a temporary card (e.g., a banking branch).

Figure 12:
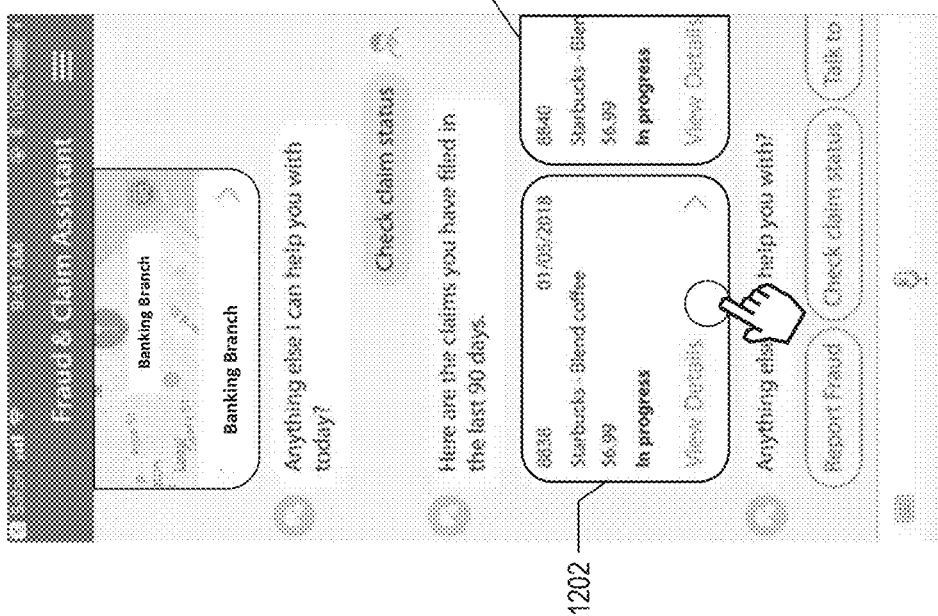

The chatbot interface may also be used by the user to complete tasks other than submitting a claim. For example, FIG. 12 presents claim objects 1202 and 1204 in response to requests from the user via the chat interface for a status update for a set of claims. Each of the claims may be associated with a respective set of transactions identified by the user as unauthorized. The claim objects may be presented in a user interface carousel claim object, wherein the user interface carousel claim object is configured to accept input from the user to scroll through the set of claims. For example, a user may swipe left on claim object 1202 to show more details of claim object 1204—while details of the same object 1202 may disappear off the left side of the screen. Each of claim objects 1202 and 1204 also includes a status (e.g., "In Progress") of the claim.

Figure 13:
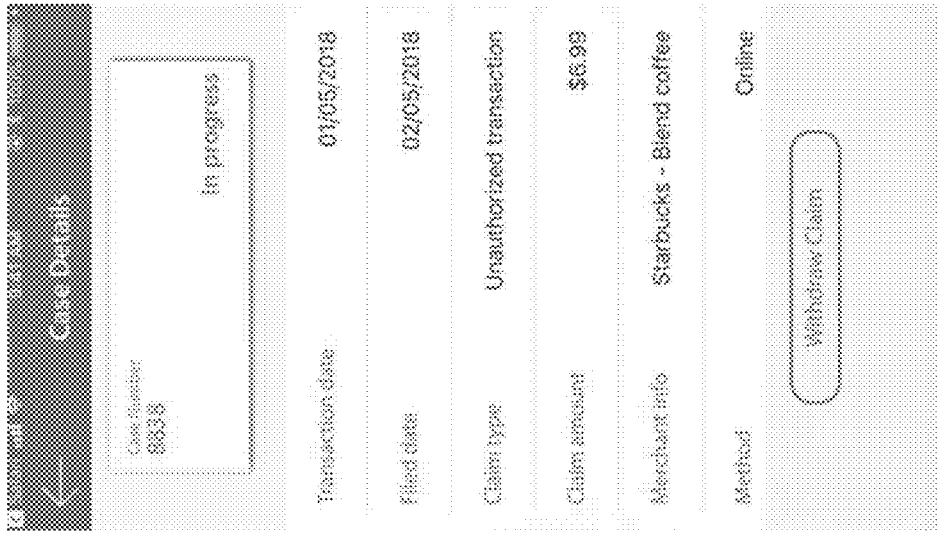
FIG. 13 illustrates a claim details interface, according to various examples.

FIG. 13 illustrates a claim details interface, according to various examples. FIG. 13 may be presented in response to application 106 receiving an indication that the user activated "view details" on claim object 1202. The claim details interface may include a representation of a claim object including the set of transactions identified by the user for the selected claim. An option is also presented to withdraw the claim. If the user activates the withdraw option, a query may be presented requesting details as to why the user wants to withdraw the claim.

Figure 14:
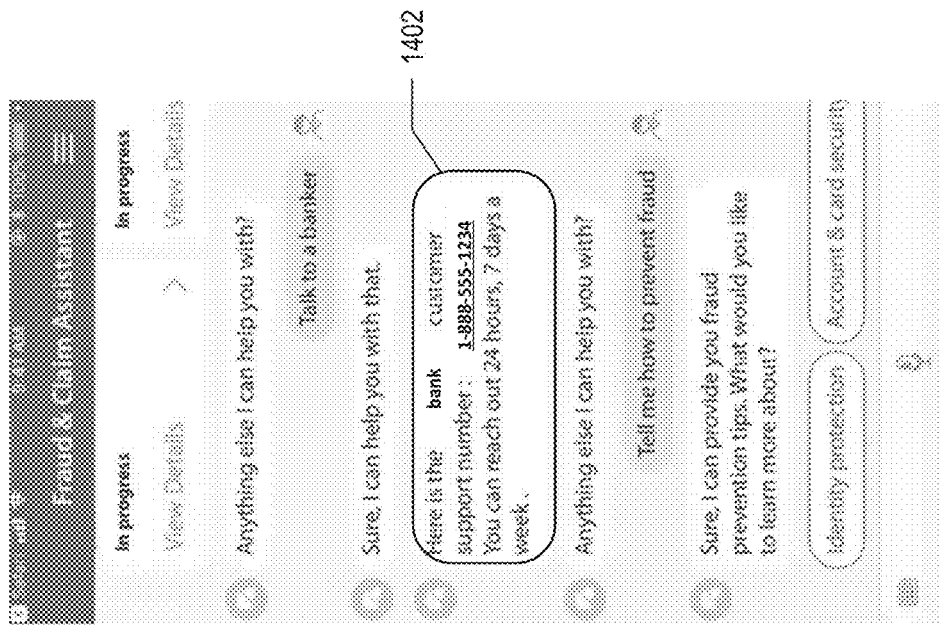
FIG. 14 is a chatbot interface, according to various examples.

FIG. 14 presents additional information that may be accessed using a chatbot interface. For example, a link (1402) to initiate telephonic communication with the banker may be presented within the chatbot interface. Upon clicking the number presented, the client device may automatically initiate a telephone call with the banker or CSR, for example.

Figure 16:
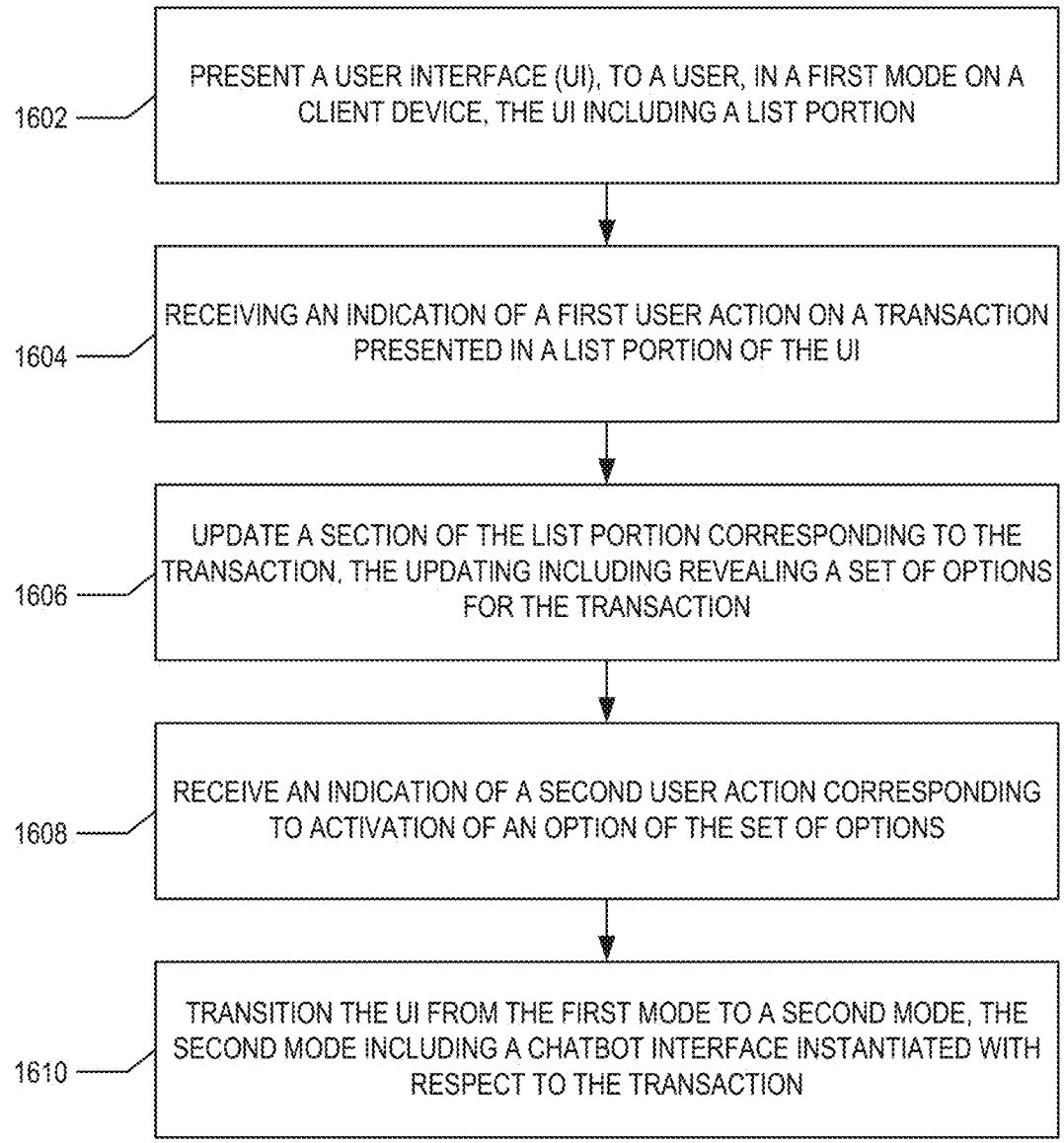
FIG. 16 is a flowchart diagram illustrating a method, according to various embodiments.

FIG. 16 is a flowchart illustrating a method, according to various examples. The method may be embodied in a set of instructions stored in at least one non-transitory storage device of a computing device(s). The computing device(s) may have one or more processors that execute the set of instructions to configure the one or more processors to perform the operations illustrated in FIG. 16. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 1602, in various examples, a user interface (UI) may be presented to a user, in a first mode on a client device. The UI may include a list portion including a plurality of transactions associated with respective activity on a user account. The client device may include an input device. The UI may be part of an application (e.g., native or web) executing on the client device At operation 1604, in various examples, an indication of a first user action may be received on a transaction presented in the list portion of the UI. The indication may be received by the application. In response to receiving the indication, a section of the list portion corresponding to the transaction may be updated (operation 1606). The updating may include revealing a set of options for the transaction. Revealing the set of options for the particular transaction may include sliding a portion of the particular transaction out of view on the client device At operation 1608, in various examples, an indication of a second user action corresponding to activation of an option of the set of options is received. In response to receiving the indication of the second user action, the UI may be transitioned from the first mode to a second mode (operation 1610). The second mode may include a chatbot interface instantiated with respect to the transaction.

The method may include an additional operation of presenting a query in the chatbot interface with respect to a status of the particular transaction. For example, the query may request the user to indicate whether or not a transaction was authorized.

Responses to queries in the chatbot interface may be made using a microphone on the client device. The method may include processing audio data (e.g., speech-to-text processing) received via the microphone to determine a response to the query. In other examples, a user may type in their responses in the chatbot interface.

The method may further include operations of receiving, via the chatbot interface, a response from the user indicating that the user activity with respect to the particular transaction was not authorized by the user. Based on the response from the user, a claim object may be generated that identifies the particular transaction as unauthorized. A representation of the claim object (e.g., a graphic) may be presented in the chatbot interface. The representation may include a set of transactions identified by the user as unauthorized. Presenting may include transmitting data from a server (e.g., transaction server 104) for display on the client device.

The method may further include operations of receiving an indication of a swipe user interaction on the representation of the claim object. Based on the interaction, the representation of the claim object may be updated to present details of another transaction identified by the user as unauthorized.

The method may further include operations of after receiving the response to the query in the chatbot interface, obtaining a location of the client device. Then, a database of stores may be queried using the location, Based on the responses to the query, a UI map object may be presented in the chatbot interface that identifies a store closest to the location of the client device.

The method may further include operations of receiving a request from the user via the chatbot interface for assistance with preventing unauthorized purchases. In response to receiving the request, a knowledge data store may be queries. Then, within the chatbot interface, information obtained in response to the querying may be presented.

The method may further include receiving a request from the user via the chatbot interface for a status update of a set of claims. The claim may be associated with a respective set of transactions identified by the user as unauthorized. In response the request, a UI carousel claim object may be presented in the chatbot interface. The UI carousel claim object may be configured to accept input from a user to scroll through the set of claims.

Furthermore, the method may include receiving an indication of a selection of a claim presented in the UT carousel claim object. In response to receiving the selection, a representation of a claim object may be presented in the chatbot interface. The representation may include a set of transactions identified by the user for the selected claim as unauthorized.

In various examples, the method may further include presenting, in the chatbot interface, a link to initiate a telephonic communication.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 17:
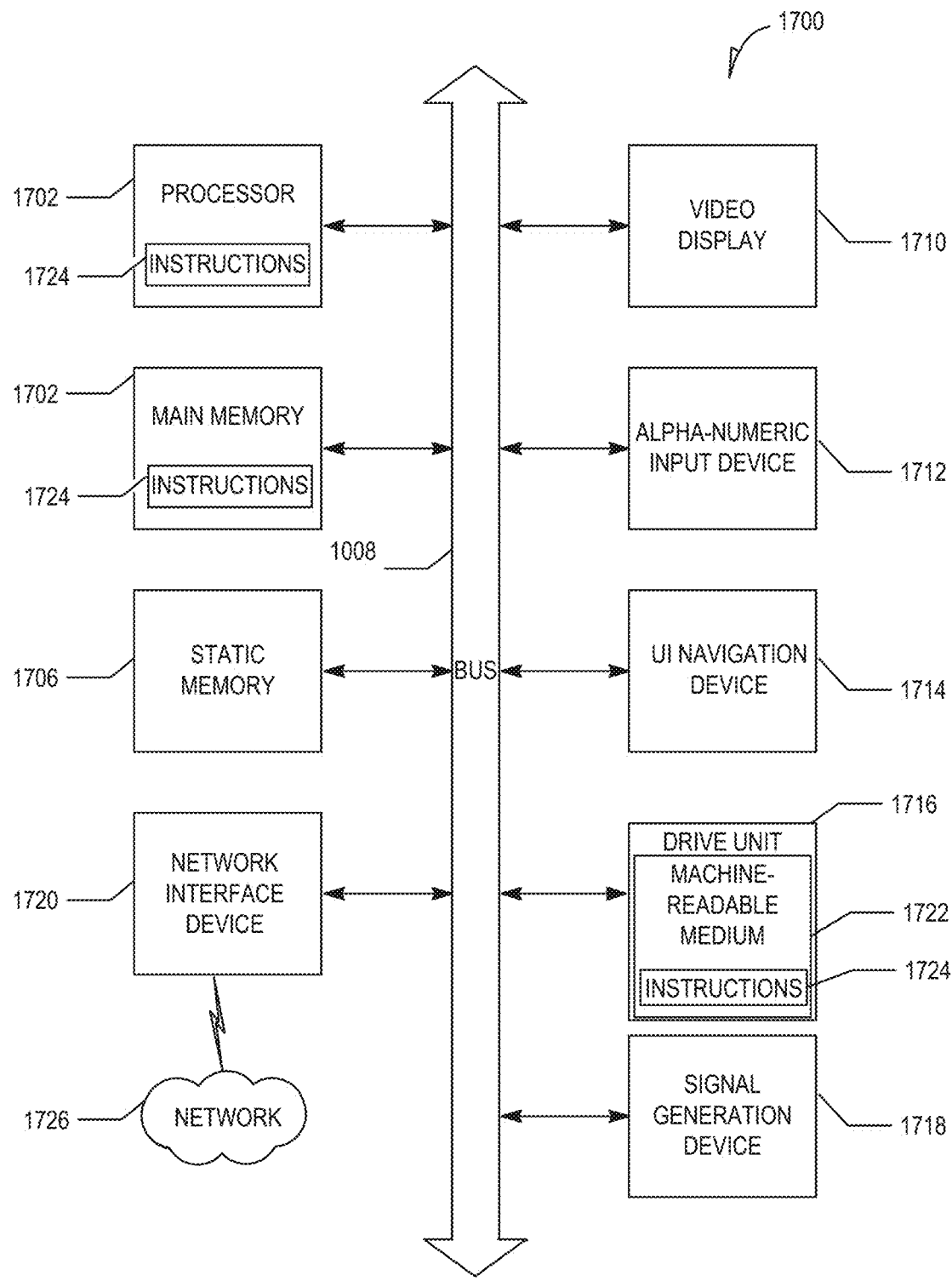
FIG. 17 is a block diagram illustrating an example machine upon which any one or more of the techniques (e.g., methodologies) discussed herein may be performed, according to an example embodiment.

FIG. 17 is a block diagram illustrating a machine in the example form of a computer system 1700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1700 includes at least one processor 1702 (e.g., a central processing unit (CPU), a graphics processing unit (GPU) or both, processor cores, compute nodes, etc.), a main memory 1704 and a static memory 1706, which communicate with each other via a link 1708 (e.g., bus). The computer system 1700 may further include a video display unit 1710, an alphanumeric input device 1712 (e.g., a keyboard), and a user interface (UI) navigation device 1714 (e.g., a mouse). In one embodiment, the video display unit 1710, input device 1712 and UI navigation device 1714 are incorporated into a touch screen display. The computer system 1700 may additionally include a storage device 1716 (e.g., a drive unit), a signal generation device 1718 (e.g., a speaker), a network interface device 1720, and one or more sensors (not shown), such as a global positioning system (GPS) sensor, compass, accelerometer, or other sensor.

The storage device 1716 includes a machine-readable medium 1722 on which is stored one or more sets of data structures and instructions 1724 (e.g., software) embodying or utilized by any one or more of the methodologies or functions described herein. The instructions 1724 may also reside, completely or at least partially, within the main memory 1704, static memory 1706, and/or within the processor 1702 during execution thereof by the computer system 1700, with the main memory 1704, static memory 1706, and the processor 1702 also constituting machine-readable media.

While the machine-readable medium 1722 is illustrated in an example embodiment to be a single medium, the term "machine-readable medium" may include a single medium or multiple media (e.g., a centralized or distributed database, and/or associated caches and servers) that store the one or more instructions 1724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1724 may further be transmitted or received over a communications network 1726 using a transmission medium via the network interface device 1720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A, 5G, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
   presenting a chatbot user interface (UI), to a user, on a client device, the chatbot UI instantiated with respect to a particular transaction of a plurality of transactions associated with respective activity on a user account;
   receiving, via the chatbot UI, a response from the user indicating that the user activity with respect to the particular transaction was not authorized by the user;
   based on the response from the user, generating a claim object that identifies the particular transaction as unauthorized;
   presenting a graphical representation of the claim object in the chatbot UI, the representation including transaction details of the particular transaction identified by the user as unauthorized;

receiving an indication of a swipe user interaction on the graphical representation of the claim object; and in response to the indication, updating a first portion of the graphical representation of the claim object to present details of another transaction identified by the user as unauthorized while keeping a second portion of the graphical representation of the claim object the same.

2. The method of claim 1, further comprising:

prior to the generating, presenting a query in the chatbot UI to user to identify the another transaction as unauthorized; and based on receiving an affirmative response from the user via the chatbot UI, adding the another transaction as part of the claim object.

3. The method of claim 2, wherein receiving the affirmative response from the user via the chatbot UI includes:

presenting a plurality of selectable buttons in the chatbot UI, a first selectable button indicating the another transaction is recognized and a second selectable button indicating the another transaction is not recognized; and receiving an indication the second selectable button has been activated.

4. The method of claim 2, further comprising:

prior to the generating, presenting a query in the chatbot UI to user requesting comments for the claim object; and storing comments received in the chatbot UI as associated with the claim object.

5. The method of claim 3, wherein the stored comments are presented in the second portion of the graphical representation of the claim object.

6. The method of claim 2, wherein updating the representation of the claim object includes:

removing presentation of transaction details of the particular transaction from the first portion of the graphical representation of the claim object; and adding presentation of the details of the another transaction to the first portion of the graphical representation of the claim object.

7. The method of claim 2, wherein the graphical representation of the claim object is configured as a carousel user interface object.

8. The method of claim 2, wherein the second portion of the graphical representation of the claim object displays summary details of the claim object that remain the same after receiving the swipe user interaction.

9. The method of claim 8, wherein the first transaction details portion includes a plurality of graphical indicators equal to a number of transactions in the claim object.

10. The method of claim 9, wherein, prior to receiving the swipe user interaction, a first of the plurality of graphical indicators is filled in and wherein after receiving the swipe user interaction, the first of the plurality pluralities of graphical indicators is not filled in and a second of the plurality of graphical indicators is filled in.

11. A non-transitory computer-readable medium comprising instructions, which when executed by a processing unit, configure the processing unit to perform operations comprising:

presenting a chatbot user interface (UI), to a user, on a client device, the chatbot UI instantiated with respect to a particular transaction of a plurality of transactions associated with respective activity on a user account;

receiving, via the chatbot UI, a response from the user indicating that the user activity with respect to the particular transaction was not authorized by the user;

based on the response from the user, generating a claim object that identifies the particular transaction as unauthorized;

presenting a graphical representation of the claim object in the chatbot UI, the representation including transaction details of the particular transaction identified by the user as unauthorized;

receiving an indication of a swipe user interaction on the graphical representation of the claim object; and in response to the indication, updating a first portion of the graphical representation of the claim object to present details of another transaction identified by the user as unauthorized while keeping a second portion of the graphical representation of the claim object the same.

12. The non-transitory computer-readable medium of claim 11, wherein the instructions, when executed by the processing unit, further configure the processing unit to perform operations comprising:

prior to the generating, presenting a query in the chatbot UI to user to identify the another transaction as unauthorized; and based on receiving an affirmative response from the user via the chatbot UI, adding the another transaction as part of the claim object.

13. The non-transitory computer-readable medium of claim 12, wherein receiving the affirmative response from the user via the chatbot UI includes:

presenting a plurality of selectable buttons in the chatbot UI, a first selectable button indicating the another transaction is recognized and a second selectable button indicating the another transaction is not recognized; and receiving an indication the second selectable button has been activated.

14. The non-transitory computer-readable medium of claim 12, wherein the instructions, when executed by the processing unit, further configure the processing unit to perform operations comprising:

prior to the generating, presenting a query in the chatbot UI to user requesting comments for the claim object; and storing comments received in the chatbot UI as associated with the claim object.

15. The non-transitory computer-readable medium of claim 13, wherein the stored comments are presented in the second portion of the graphical representation of the claim object.

16. The non-transitory computer-readable medium of claim 12, wherein updating the representation of the claim object includes:

removing presentation of transaction details of the particular transaction from the first portion of the graphical representation of the claim object; and adding presentation of the details of the another transaction to the first portion of the graphical representation of the claim object.

17. The non-transitory computer-readable medium of claim 12, wherein the graphical representation of the claim object is configured as a carousel user interface object.

18. The non-transitory computer-readable medium of claim 12, wherein the second portion of the graphical representation of the claim object displays summary details of the claim object that remain the same after receiving the swipe user interaction.

19. The non-transitory computer-readable medium of claim 18, wherein the first transaction details portion includes a plurality of graphical indicators equal to a number of transactions in the claim object.

20. A system comprising:
   at least one processor; and
   a storage device comprising instructions, which when executed by a processing unit, configure the processing unit to perform operations comprising:
      presenting a chatbot user interface (UI), to a user, on a client device, the chatbot UI instantiated with respect to a particular transaction of a plurality of transactions associated with respective activity on a user account;
      receiving, via the chatbot UI, a response from the user indicating that the user activity with respect to the particular transaction was not authorized by the user;
      based on the response from the user, generating a claim object that identifies the particular transaction as unauthorized;
      presenting a graphical representation of the claim object in the chatbot UI, the representation including transaction details of the particular transaction identified by the user as unauthorized;
      receiving an indication of a swipe user interaction on the graphical representation of the claim object; and
      in response to the indication, updating a first portion of the graphical representation of the claim object to present details of another transaction identified by the user as unauthorized while keeping a second portion of the graphical representation of the claim object the same.

* * * * *